United States Patent
Kang et al.

(10) Patent No.: US 8,114,536 B2
(45) Date of Patent: Feb. 14, 2012

(54) FRAME MEMBER AND BATTERY PACK EMPLOYED WITH THE SAME

(75) Inventors: Dongha Kang, Seoul (KR); SungGeun Yoon, Seoul (KR); Jaesik Chung, Seoul (KR)

(73) Assignee: LG Chem, Ltd. (KR)

( * ) Notice: Subject to any disclaimer, the term of this patent is extended or adjusted under 35 U.S.C. 154(b) by 1107 days.

(21) Appl. No.: 11/616,641

(22) Filed: Dec. 27, 2006

(65) Prior Publication Data

US 2007/0264562 A1 Nov. 15, 2007

(30) Foreign Application Priority Data

Dec. 27, 2005 (KR) .................. 10-2005-0130423
Jan. 16, 2006 (KR) .................. 10-2006-0004276

(51) Int. Cl.
*H01M 2/10* (2006.01)

(52) U.S. Cl. ............ 429/96; 429/99; 429/100; 429/130; 429/135; 429/148; 429/149; 429/151; 429/152; 429/153; 429/154; 429/155; 429/159; 429/163; 429/176; 429/177

(58) Field of Classification Search ............ 429/96, 429/99, 100, 130, 133, 135, 148, 149, 151–155, 429/163, 164, 176, 177
See application file for complete search history.

(56) References Cited

U.S. PATENT DOCUMENTS

| | | | | |
|---|---|---|---|---|
| 4,089,044 A | * | 5/1978 | Gatto et al. | 361/814 |
| 5,585,710 A | * | 12/1996 | Nakamura et al. | 320/112 |
| 5,962,159 A | * | 10/1999 | Satou et al. | 429/99 |
| 6,465,123 B1 | * | 10/2002 | Baumann et al. | 429/99 |
| 6,479,185 B1 | * | 11/2002 | Hilderbrand et al. | 429/148 |
| 2001/0046624 A1 | | 11/2001 | Goto et al. | |
| 2003/0211382 A1 | * | 11/2003 | Aoyama | 429/96 |
| 2006/0141347 A1 | * | 6/2006 | Glauning et al. | 429/120 |

FOREIGN PATENT DOCUMENTS

| | | |
|---|---|---|
| DE | 10338654 | 3/2005 |
| JP | 2000100401 | 4/2000 |
| KR | 19950010160 | 4/1995 |
| KR | 1019960039700 | 11/1996 |

* cited by examiner

*Primary Examiner* — Patrick Ryan
*Assistant Examiner* — Ben Lewis
(74) *Attorney, Agent, or Firm* — Cantor Colburn LLP (57) ABSTRACT

Disclosed herein are a frame member including an upper frame member having one major surface to which a protection circuit module (PCM) is mounted, and a lower frame member coupled with the upper frame member, the upper and lower frame members being provided at opposite major surfaces thereof with semi-cylindrical battery receiving parts corresponding to outer surfaces of the cylindrical unit cells mounted between the upper and lower frame members, a spacer provided at opposite major surfaces of a rectangular frame with pluralities of semi-cylindrical battery receiving parts corresponding to outer surfaces of the cylindrical batteries, the battery receiving parts being partially open such that the battery receiving parts communicate with neighboring battery receiving parts on the same plane, and a battery pack including the frame member and the spacer.

19 Claims, 7 Drawing Sheets

FRAME MEMBER AND BATTERY PACK EMPLOYED WITH THE SAME

FIELD OF THE INVENTION

The present invention relates to a frame member including an upper frame member having one major surface to which a protection circuit module (PCM) is mounted, and a lower frame member coupled with the upper frame member, the upper and lower frame members being provided at opposite major surfaces thereof with semi-cylindrical battery receiving parts corresponding to outer surfaces of the cylindrical unit cells mounted between the upper and lower frame members, a spacer provided at opposite major surfaces of a rectangular frame with pluralities of semi-cylindrical battery receiving parts corresponding to outer surfaces of the cylindrical batteries, the battery receiving parts being partially open such that the battery receiving parts communicate with neighboring battery receiving parts on the same plane, and a battery pack including the frame member and the spacer.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

Based on kinds of external devices in which the secondary battery is used, the secondary battery may be used in the form of a single unit cell or in the form of a battery pack including a plurality of unit cells electrically connected with each other. For example, small-sized devices, such as mobile phones, can be operated for a predetermined period of time with the output and the capacity of a single unit cell. On the other hand, medium- or large-sized devices, such as lap-top computers, electric vehicles, or hybrid electric vehicles, require use of a battery pack because high output and large capacity are necessary for the medium- or large-sized devices.

The battery pack is a battery structure in which a plurality of unit cells are arranged in series and/or in parallel with each other and electrically connected with each other in regular sequence. It is very important to maintain the arrangement structure of the unit cells in the battery pack.

When the battery pack is generally constructed, cylindrical secondary batteries, prismatic secondary batteries, or pouch-shaped secondary batteries may be used as the unit cells. When the prismatic secondary batteries or the pouch-shaped secondary batteries are used as the unit cells, the batteries can be easily stacked one on another, and the arrangement structure of the batteries is stable, whereby there is no problem in electrically connecting the batteries with each other. However, the cylindrical secondary batteries, which have greater capacity than the prismatic secondary batteries or the pouch-shaped secondary batteries, have great difficulty in maintaining the arrangement structure due to the appearance characteristics thereof.

For this reason, there has normally been used a method of securely connecting cylindrical unit cells to a nickel plate by soldering or spot welding and wrapping the connected cylindrical unit cells with tape or coating the connected cylindrical unit cells with plastic so as to maintain the arrangement structure of the cylindrical unit cells, thereby constructing a battery pack.

However, the strength of the tape and the plastic coating is small, and therefore, the possibility is very high that the tape and the plastic coating are damaged or broken. Consequently, the tape and the plastic coating are not suitable for stably maintaining the arrangement structure of the unit cells. In addition, when the battery pack is constructed using the tape, a process for detaching and attaching the tape is complicated and troublesome, which is a factor that increases the time necessary for constructing the battery pack.

Also, the battery pack is generally constructed in the form of a hard pack manufactured by mounting a protection circuit to a core pack having unit cells arranged therein and wrapping the outer surface of the core pack with an outer case. When the hard pack is constructed with the cylindrical unit cells, a device for maintaining the arrangement structure of the cylindrical unit cells as well as the outer case for stably mounting the protection circuit are used, which increases the manufacturing costs and the process time.

Consequently, various types of fixing devices for maintaining the arrangement structure of cylindrical batteries have been developed. For example, Korean Patent Application Publication No. 1995-10160 discloses a fixing device including a spacer (a middle spacer) positioned in the middle of cylindrical batteries and a coupling member for integrally wrapping the outer surfaces of the batteries while the batteries are located at the middle spacer. In the disclosed fixing device, however, the middle spacer and the coupling member are separately manufactured, and therefore, the assembly process is troublesome. Also, when the coupling member is not mounted in position, the coupling member may be separated from the middle spacer.

Japanese Patent Application Publication No. 2000-100401 discloses a middle spacer similar to the aforesaid spacer. However, this middle spacer only serves to space the cylindrical batteries from each other. In order to fix the cylindrical batteries, it is necessary to fix electrode terminals of the cylindrical batteries to a circuit board using an electrode connection plate, as shown in FIG. 1 of the publication. Consequently, the use of this spacer is restricted, and the assembly process is very troublesome.

In addition, U.S. Patent Application Publication No. 2001-46624 discloses a fixing device including a pair of upper and lower covers in which pluralities of cylindrical batteries are mounted in a two-layer structure, a middle cover, and a plurality of holding ribs formed at the insides of the covers. The fixing device has an advantage in that the cylindrical batteries are stably mounted; however, the fixing device has a disadvantage in that the cylindrical batteries are supported on the covers by the holding ribs, and therefore, when the strength of the ribs is not sufficient, the structural stability of the fixing device is lowered. Especially, the middle cover does not provide sufficient mechanical strength due to the structural characteristics thereof.

Consequently, there is very high necessity of a structural device that is capable of stably mounting a protection circuit without an additional outer case while maintaining the arrangement structure of the cylindrical unit cells.

SUMMARY OF THE INVENTION

Therefore, the present invention has been made to solve the above problems, and other technical problems that have yet to be resolved.

Specifically, it is an object of the present invention to provide a frame member that is capable of stably mounting cylindrical unit cells and a protection circuit module (PCM) while preventing the occurrence of internal short circuits.

It is another object of the present invention to provide a spacer that is capable of stacking cylindrical unit cells with high integration while minimizing the number of components and effectively removing heat generated from the unit cells during charge and discharge of the unit cells.

It is a further object of the present invention to provide a battery pack that exhibits high structural stability through the use of the frame member and the spacer and can be manufactured in a compact structure through a simple assembly process.

In accordance with one aspect of the present invention, the above and other objects can be accomplished by the provision of a frame member used to prepare a battery pack using cylindrical batteries as unit cells, wherein the frame member includes an upper frame member having one major surface to which a protection circuit module (PCM) is mounted, and a lower frame member coupled with the upper frame member, the upper and lower frame members being provided at opposite major surfaces thereof with semi-cylindrical battery receiving parts corresponding to outer surfaces of the cylindrical unit cells mounted between the upper and lower frame members.

Preferably, each battery receiving part is constructed in a structure in which each semi-cylindrical battery receiving part is open at a middle part thereof such that two neighboring unit cells communicate with each other through the open middle part and each semi-cylindrical battery receiving part partially surrounds upper and lower parts of the unit cells. Consequently, when the unit cells are received in the battery receiving parts, the upper and lower parts of the unit cells are fixed while the unit cells are separated from the neighboring unit cells by the battery receiving parts, and the middle parts of the unit cells communicate with the middle parts of the neighboring unit cells, whereby heat generated from the unit cells during the charge of the unit cells is effectively removed.

In a preferred embodiment, each battery receiving part includes plate-shaped side extensions protruding along the semi-cylindrical circumferential surfaces thereof in the shape of a semicircle for partially covering outer circumferential surfaces at opposite ends of the corresponding unit cell while electrode terminals of the corresponding unit cell are exposed. The semi-cylindrical battery receiving parts, which surround the upper and lower parts of the unit cells, serve to prevent the movement of the unit cells in the lateral direction, whereas the side extensions of the battery receiving parts serve to prevent the movement of the unit cells in the longitudinal direction.

The upper and lower frame members may be coupled with each other in various manners. For example, the upper and lower frame members are provided with predetermined coupling parts such that the upper and lower frame members are coupled with each other by the coupling between the coupling parts of the upper and lower frame members, or the upper and lower frame members are coupled with each other by additional coupling members.

In a preferred embodiment, the upper and lower frame members are provided with assemblable coupling parts that can be coupled with and separated from each other, respectively.

For example, the assemblable coupling parts may include bars extending from sides of the upper and/or lower frame members and having coupling elements formed at ends thereof, and coupling grooves, corresponding to the bars, formed at the lower and/or upper frame members.

As an example, the coupling elements may be engageable and disengageable hooks formed at the ends of the bars, and the coupling grooves may be coupling grooves formed in the inserting direction of the bars such that the hooks are inserted through the coupling grooves, respectively. The hooks are inserted through the corresponding coupling grooves and are then caught by stoppers formed by the thickness of the coupling grooves, whereby the upper and lower frame members are coupled with each other.

As another example, the coupling elements may be coupling elements having holes formed at the ends of the bars, and the coupling grooves may be coupling grooves formed such that the coupling grooves communicate with the holes of the coupling elements, respectively. The holes of the coupling elements and the coupling grooves are provided at inner surfaces thereof with thread parts, and additional screws are threadedly engaged with the inner surfaces of the holes of the coupling elements and the coupling grooves.

In the case that the coupling elements are the hooks, it is preferable to the ends of the bars to have a small thickness such that the hooks are elastic when the hooks are inserted through coupling grooves.

The bars are formed at two diagonally opposite corners of the upper frame member and at two diagonally opposite corners of the lower frame member which are adjacent to the diagonally opposite corners of the upper frame member. The coupling grooves are formed at diagonally opposite corners of the upper and lower frame members where the bars are not formed. Consequently, when the upper and lower frame members are coupled with each other, a hexahedral inner space is defined inside the upper and lower frame members by the four bars, and the unit cells are stably mounted in the hexahedral inner space.

As described above, the upper frame member is provided at an upper major surface thereof with assemblable coupling parts for coupling the PCM to the upper frame member. The PCM is a module including a protection circuit for controlling the overcharge, overdischarge, and over current of the battery pack. Preferably, the PCM is constructed in the form of a printed circuit board (PCB).

The assemblable coupling parts for coupling the PCM may be slide coupling type protrusions or engageable and disengageable hooks formed at sides or corners of the upper frame member.

In the case that the coupling parts are the slide coupling type protrusions, preferably, the slide coupling type protrusions are formed at two opposite sides or two opposite corners of the frame member, a hook type protrusion is formed at one side or one corner of the frame, such that the hook type protrusion protrudes toward the inside of the upper major surface of the frame member, so as to fix the PCM when the PCM is coupled with the slide coupling type protrusions in a sliding fashion, and a groove corresponding to the hook type protrusion is formed at one end of the PCM.

In the case that the coupling parts are the engageable and disengageable hooks, preferably, the engageable and disengageable hooks are formed at two opposite sides or two opposite corners of the frame, and grooves corresponding to the hooks are formed at one end of the PCM.

According to circumstances, the upper and lower frame members may be constructed in the same shape, and the upper and lower frame members may be assembled by arranging the upper and lower frame members such that the upper and lower frame members are opposite to each other and coupling upper and lower frame members with each other. In this case, the coupling between the upper and lower frame members may be accomplished by the predetermined coupling parts formed at the frame member or by the additional coupling members, such as fasteners or screws, as previously described.

According to the present invention, the frame member is preferably made of a plastic material having light weight and high heat resistance, such as polycarbonate (PC) or polyacrylonitrile-butadiene-styrene (ABS), and the frame member is manufactured by injection molding.

In accordance with another aspect of the present invention, there is provided a spacer used to prepare a battery pack using cylindrical batteries as unit cells, wherein the spacer is provided at opposite major surfaces of a rectangular frame with pluralities of semi-cylindrical battery receiving parts corresponding to outer surfaces of the cylindrical batteries, the battery receiving parts being partially open such that the battery receiving parts communicate with neighboring battery receiving parts on the same plane.

Preferably, the battery receiving parts are provided at the upper and lower ends thereof with covers, which protrude toward upper and lower end surfaces of the unit cells along semi-cylindrical circumferential surfaces thereof to stably fix the unit cells. Specifically, the covers protrude from the cylindrical outer circumferential surfaces of the battery receiving parts by a length sufficient to partially surround the upper and lower end surfaces of the unit cells. Consequently, the protruding length of the covers is not particularly restricted so long as the covers can partially surround the upper and lower end surfaces of the unit cells.

In a preferred embodiment, the covers protrude from the semi-cylindrical inner circumferential surfaces of the battery receiving parts in a U-shaped (horseshoe-shaped) plate structure, whereby the covers correspond to the upper and lower end surfaces of the unit cells when the unit cells are received in the respective battery receiving parts. These U-shaped protrusions serve to fix the unit cells; however, the U-shaped protrusions do not fully hide electrode terminals of the unit cells, and therefore, the electrical connection between the unit cells is easily accomplished.

As described above, the battery receiving parts are partially open such that the battery receiving parts communicate with neighboring battery receiving parts on the same plane. Hereinafter, the open regions will be referred to as "opening parts."

Preferably, the opening parts are formed in the middle regions of the battery receiving parts. When the opening parts are constructed in a full opening structure, the opening parts have no additional height such that the opening parts are equal to the thickness of the rectangular frame. In this case, the frame is constructed in a plate-shaped structure in which a plurality of semi-cylindrical battery receiving parts are formed at the upper and lower parts of the frame, and the middle part of the frame is integrally connected with the upper and lower parts of the frame. Consequently, when the unit cells are received in the battery receiving parts, the upper and lower parts of the unit cells are fixed, while being separated from the neighboring unit cells, due to the semi-cylindrical structure of the battery receiving parts, and the middle parts of the unit cells communicate with the middle parts of the neighboring unit cells.

Also, the battery receiving parts may have through-holes (hereinafter, referred to as "first through-holes"), through which the battery receiving parts formed at one major surface of the rectangular frame communicate with the battery receiving parts formed at the other major surface of the rectangular frame. Specifically, the first through-holes are formed in the plate-shaped middle regions of the battery receiving parts. The size and number of the first through-holes are not particularly restricted. The first through-holes may be omitted as needed.

The first through-holes are used as flow channels for a coolant, such as air, like the opening parts, and therefore, heat generated from the unit cells during the charge and discharge of the unit cells is effectively removed.

In a preferred embodiment, the spacer according to the present invention is provided at positions where every four battery receiving parts adjacent to each other on the same plane and the opposite plane of the rectangular frame intersect with vertical through-channels. Each vertical through-channel may be regarded as a vacant space formed between four circles when the four circles are arranged such that centers of the circles are positioned at respective corners of an imaginary square and the circumference of each circle touches the circumferences of the circles positioned at neighboring corners of the square. Consequently, the vertical through-channels are formed in the center of the upper end surface of the spacer along the battery receiving parts. The vertical through-channels are formed in the shape of a rhombus comprising four curved surfaces. The size and the number of the vertical through-channels are decided depending upon the size and the number of the unit cells to be used.

Temperature sensors for measuring the temperature of the unit cells may be mounted in the spacer. Specifically, the temperature sensors may be mounted in one or more opening parts. The opening parts, in which the temperature sensors are mounted, may be constructed in a structure in which horizontal through-holes are formed in the opening parts such that the horizontal through-holes extend through the frame, whereby the mounting of the temperature sensors is easily accomplished, and the effect obtained by the provision of the temperature sensors is maximized. Hereinafter, the horizontal through-holes will be referred to as "second through-holes." The second through-holes are formed in the middle regions of the opening parts such that the second through-holes communicate with the vertical through-channels, respectively. The second through-holes are formed in the plate-shaped middle part of the spacer together with the first through-holes in line in the lateral direction. The number of the second through-holes is decided depending upon the number of the temperature sensors mounted in the opening parts.

Kinds of the temperature sensors are not particularly restricted. Preferably, the temperature sensors are thermistors.

In the present invention, the rectangular frame is a rectangular member having pluralities of battery receiving parts formed at opposite major surfaces thereof. In a broad sense, the rectangular frame is regarded as a spacer formed by the combination of the battery receiving parts.

Like the above-described frame member, the spacer according to the present invention is preferably made of a plastic material having light weight and high heat resistance, such as polycarbonate (PC) or polyacrylonitrile-butadiene-styrene (ABS), and the frame member is manufactured, for example, by injection molding. However, the material for the spacer may be different from that for the frame member.

In accordance with yet another aspect of the present invention, there is provided a battery pack constructed by loading cylindrical batteries to the spacer with the above-stated structure, i.e., the spacer provided at opposite major surfaces of the rectangular frame with pluralities of semi-cylindrical battery receiving parts corresponding to outer surfaces of the cylindrical batteries, the battery receiving parts being partially open such that the battery receiving parts communicate with neighboring battery receiving parts on the same plane, and mounting the cylindrical batteries with the spacer to the frame member with the above-stated structure.

The battery pack according to the present invention may be used in a medium- or large-sized battery system requiring a combination of two or more batteries. For example, the battery module according to the present invention may be widely used in a battery system for medium-sized devices, such as laptop computers, and in a battery system for large-sized devices, such as electric vehicles and hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
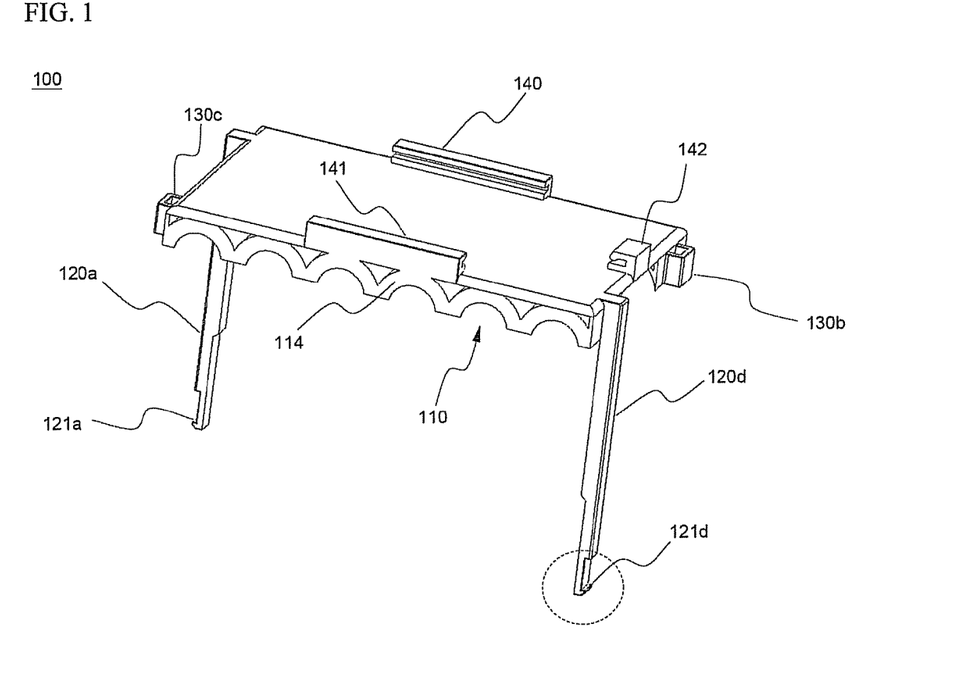
FIG. 1 is a perspective view illustrating an upper frame member of a frame member for battery pack preparation according to a preferred embodiment of the present invention.

FIG. 1 is a perspective view typically illustrating an upper frame member 100 of a frame member for battery pack preparation according to a preferred embodiment of the present invention.

Referring to FIG. 1, the upper frame member 100 is an assemblable coupling part, to the upper major surface of which a protection circuit module (PCM) (not shown) is mounted. The upper frame member 100 is provided at the upper major surface thereof with slide coupling type protrusions 140 and 141 and a hook type protrusion 142. The upper frame member 100 is provided at the lower major surface thereof with semi-cylindrical battery receiving parts 110 constructed in a form corresponding to the outer surfaces of cylindrical unit cells (not shown) for receiving the cylindrical unit cells. Also, the upper frame member 100 is provided at the corners of the lower major surface thereof with hooks 121a and 121d and coupling grooves 130b and 130c, which are diagonally opposite to each other. The upper frame member 100 is coupled with a lower frame (not shown) by the hooks 121a and 121d and the coupling grooves 130b and 130c.

The slide coupling type protrusions 140 and 141 are formed at opposite longitudinal sides of the upper frame member 100. The hook type protrusion 142 protrudes toward the inside of the upper major surface of the upper frame member 100 such that the PCM can be fixed by the hook type protrusion 142 when the PCM is coupled with the slide coupling type protrusions 140 and 141 in a sliding fashion. In one end of the PCM is formed a groove corresponding to the hook type protrusion 142.

Each semi-cylindrical battery receiving part 110 is provided with plate-shaped side extensions 114 protruding in the shape of a semicircle for partially covering the opposite ends of the corresponding unit cell.

The hooks 121a and 121d are formed at the ends of bars 120a and 120d extending from two diagonally opposite corners of the upper frame member 100. Portions of the bars 120a and 120d adjacent to the hooks 121a and 121d have a thickness less than that of other portions of the bars 120a and 120d such that the hooks 121a and 121d are elastic when the hooks 121a and 121d are inserted into coupling grooves of the lower frame member (not shown).

The coupling grooves 130b and 130c are formed in the inserting direction of hooks of the lower frame member such that the hooks of the lower frame member are inserted through the coupling grooves 130b and 130c, respectively. Also, the coupling grooves 130b and 130c have a predetermined thickness sufficient to serve as stoppers when the hooks of the lower frame member are coupled into the coupling grooves 130b and 130c, respectively.

Figure 2:
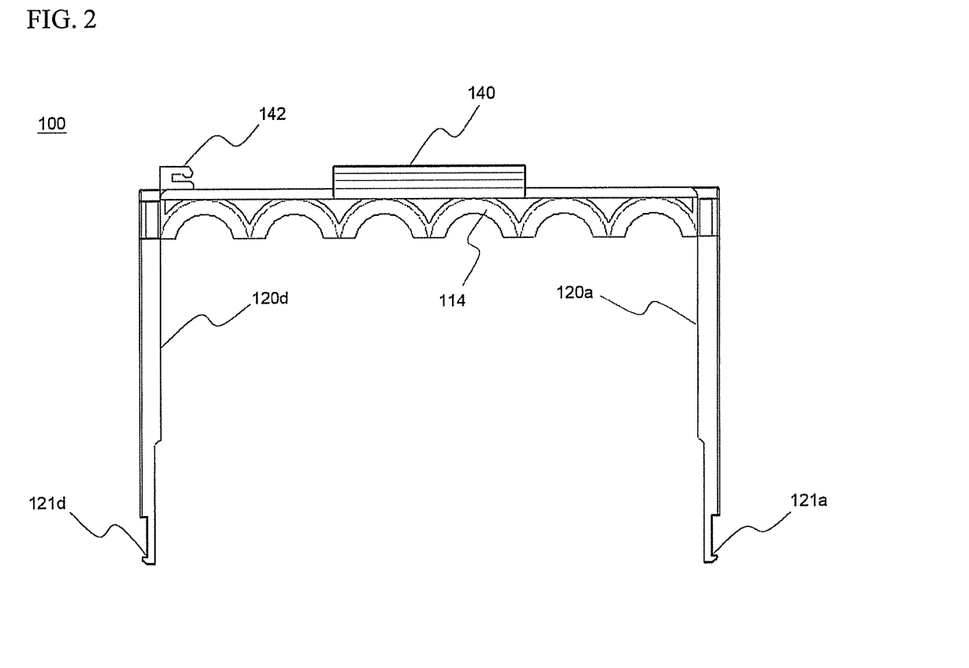
FIG. 2 is a rear see-through view of the upper frame member of FIG. 1.
Figure 3:
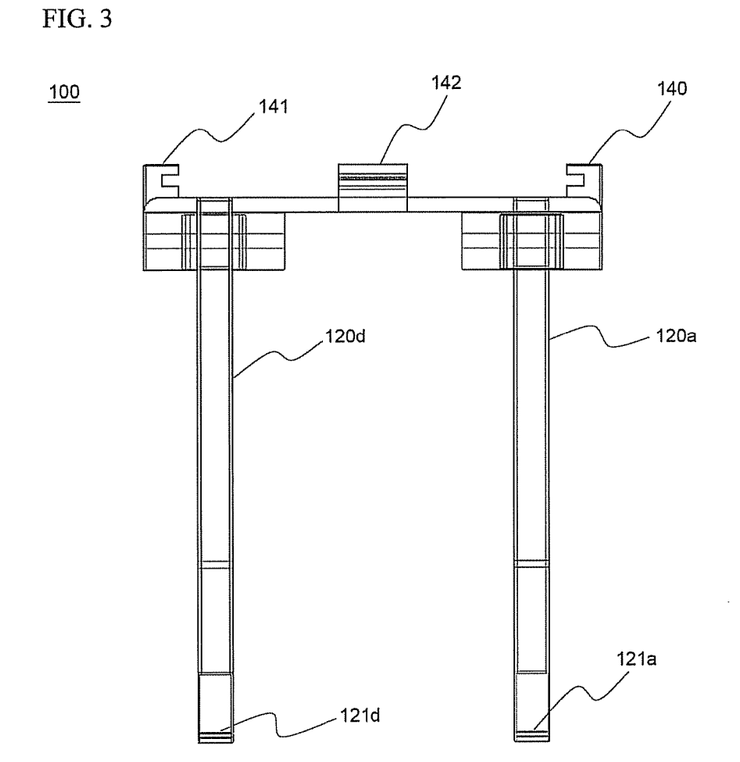
FIG. 3 is a right side see-through view of the upper frame member of FIG. 1.

This structure is illustrated in more detail in FIG. 2, which is a rear see-through view of the upper frame member 100, and FIG. 3, which is a right side see-through view of the upper frame member 100.

Referring to these drawings, it can be seen that, as shown in FIG. 1, the upper frame member 100 includes the slide coupling type protrusions 140 and 141 and the hook type protrusion 142 formed at the upper major surface thereof, the plate-shaped side extensions 114 protruding in the shape of a semicircle, the bars 120a and 120d extending from the two diagonally opposite corners thereof, and the hooks 121a and 121d formed at the ends of the corresponding bars 120a and 120d.

Figure 4:
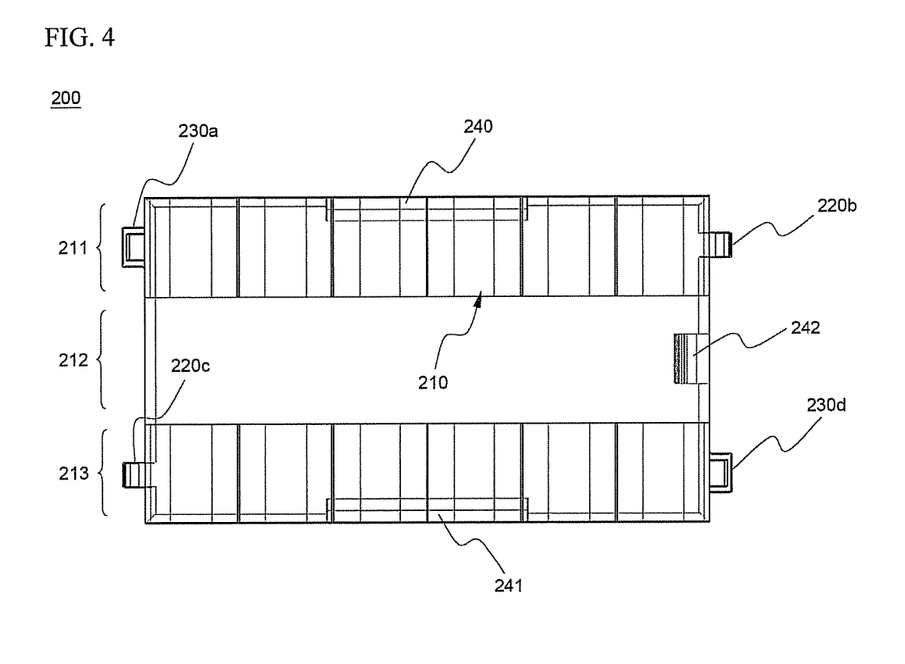
FIG. 4 is a plan see-through view of a lower frame member to be coupled with the upper frame member of FIG. 1.

FIG. 4 is a plan view typically illustrating an exemplary lower frame member that can be coupled with the upper frame member of FIG. 1.

Referring to FIG. 4, the lower frame member 200 is provided at the lower major surface thereof with semi-cylindrical battery receiving parts 210 constructed in a form corresponding to the outer surfaces of cylindrical unit cells (not shown) for receiving the cylindrical unit cells.

Upper parts 211 and lower parts 212 of the battery receiving parts 210 are constructed in a semi-cylindrical structure in which neighboring batteries are fixed while being separated from each other. Middle parts 213 of the battery receiving parts 210 are opened such that neighboring batteries communicate with each other. Consequently, the battery receiving parts 210 are generally formed in a plate-shaped structure integrally connected in the lateral direction thereof.

The lower frame member 200 is provided at predetermined positions thereof with coupling grooves 230a and 230d corresponding to the hooks 121a and 121d of the upper frame member 100 and hooks 220b and 220c corresponding to the coupling grooves 130b and 130c of the upper frame member 100 such that the lower frame member 200 can be coupled with the upper frame member 100 of FIG. 1. Consequently, the upper and lower frame members 100 and 200 are coupled with each other by inserting the hooks 121a and 121d of the upper frame member 100 into the hooks 230b and 230c of the lower frame member 200, respectively, and inserting the hooks 220b and 220c of the lower frame member 200 into the coupling grooves 130b and 130c of the upper frame member 100, respectively.

According to circumstances, the lower frame member 200 may be provided at the lower major surface thereof with slide coupling type protrusions 240 and 241 and a hook type protrusion 242 for mounting the PCM (not shown).

Figure 5:
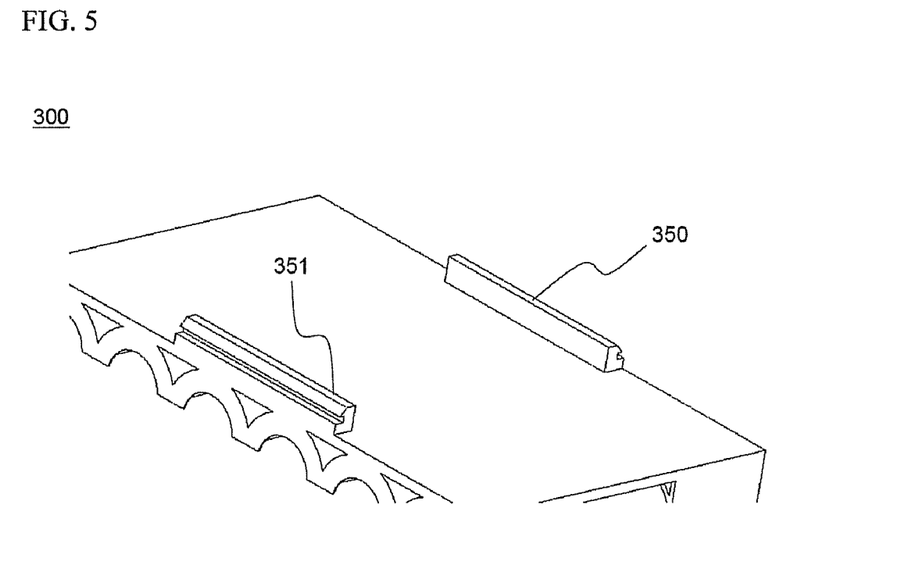
FIG. 5 is a perspective view illustrating a hook structure for protection circuit coupling of a frame member according to another preferred embodiment of the present invention.

FIG. 5 is a perspective view partially illustrating a frame member according to another preferred embodiment of the present invention.

Referring to FIG. 5, the frame member 300 is provided at the upper major surface thereof with coupling parts 350 and 351 for coupling a PCM (not shown). The coupling parts 350 and 351 protrude from the opposite longitudinal sides of the frame member 300. The coupling parts 350 and 351 are constructed in a long hook structure in which the ends of the hooks face outward. The PCM is provided with coupling grooves (not shown) corresponding to the hook type coupling parts 350 and 351 of the frame member 300. The PCM is coupled with the frame member 300 by inserting the hook type coupling parts 350 and 351 of the frame member 300 into the coupling grooves of the PCM. However, the PCM may be mounted to the upper major surface of the frame member 300 in various coupling structures in addition to the structures as shown in FIGS. 1 and 5, and such coupling structures must be interpreted to be within the scope of the present invention.

Figure 6:
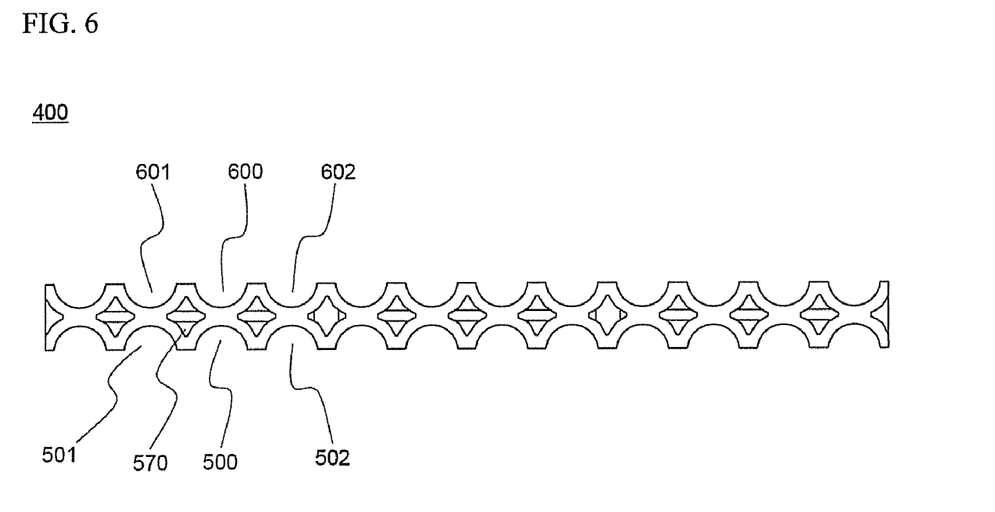
FIGS. 6 and 7 are a plan view and a perspective view, respectively, illustrating a spacer for battery module preparation according to a preferred embodiment of the present invention.
Figure 7:
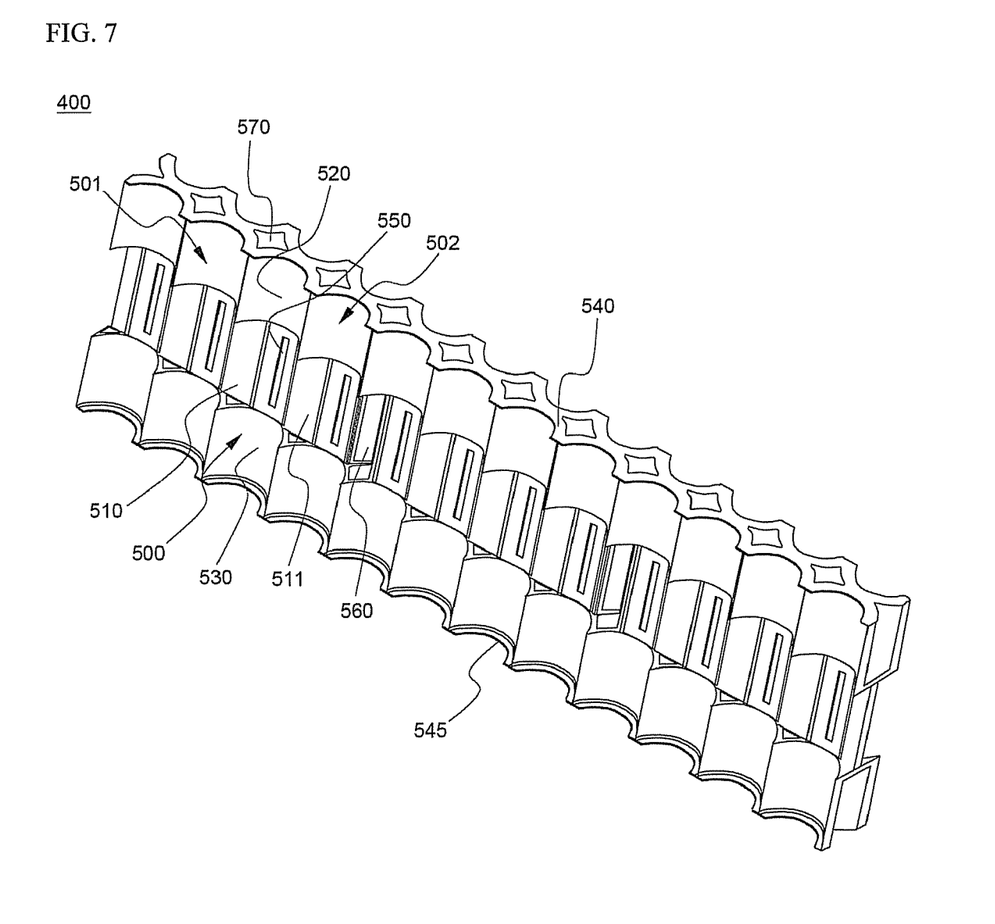

FIGS. 6 and 7 are a plan view and a perspective view, respectively, illustrating a spacer for battery module preparation according to a preferred embodiment of the present invention.

Referring to these drawings, the spacer 400 is constructed in the form of a rectangular frame. The spacer 400 is provided at opposite major surfaces thereof, i.e., the upper and lower surfaces thereof, with pluralities of semi-cylindrical battery receiving parts 500, 501, and 502 corresponding to the outer surfaces of cylindrical unit cells (not shown) for receiving the cylindrical unit cells. The respective battery receiving parts 500 are provided at the middle regions thereof with opening parts 510 and 511, through which two neighboring battery receiving parts 501 and 502 communicate with each other. Specifically, each battery receiving part 500 is constructed in a structure in which an upper part 520 and a lower part 530 having a semi-cylindrical inner surface structure are separated from each other due to the opening part 510 formed at the middle of each battery receiving part 500. The detailed structure of the opening part 510 is illustrated in more detail in FIG. 8, which is a side view of the spacer.

Figure 8:
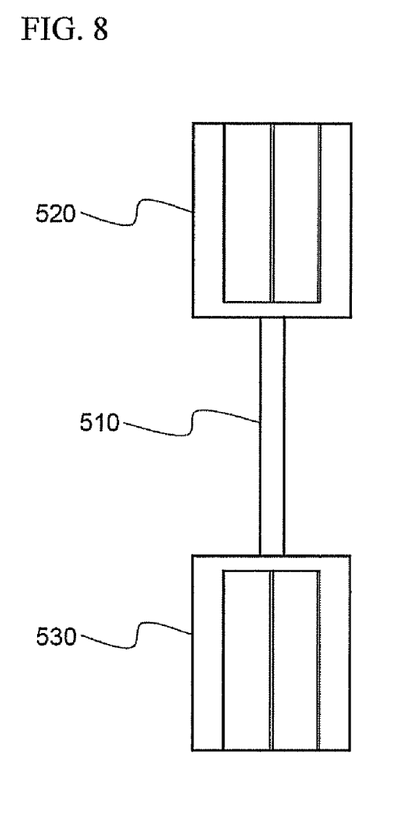
FIG. 8 is a side view of the spacer for battery module preparation of FIG. 6.

Referring to FIG. 8, the opening part 510 has no additional height as compared with the upper part 520 and the lower part 530 having the semi-cylindrical inner surface structure, and therefore, the opening part 510 is formed in the shape of a complete flat surface. Consequently, when cylindrical unit cells are received in the respective battery receiving parts, the middle parts of the cylindrical unit cells are exposed through the opening part 510.

Referring back to FIGS. 6 and 7, the battery receiving parts 500 are provided at the upper and lower ends thereof with covers 540 and 545. The covers 540 and 545 protrude in a U-shaped plate structure along the semi-cylindrical circumferential surfaces thereof to partially surround the upper and lower end surfaces of the unit cells (not shown). Consequently, the covers 540 and 545 surround the upper and lower end surfaces of the unit cells to stably fix the unit cells; however, the covers 540 and 545 are constructed in the U-shaped structure, and therefore, electrode terminals of the unit cells are not hidden by the covers 540 and 545.

Figure 9:
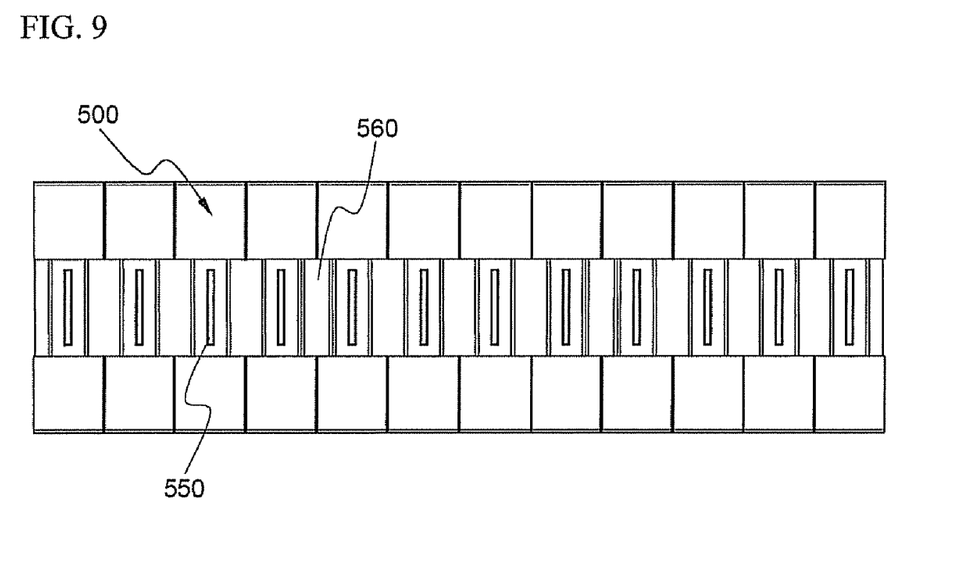
FIG. 9 is a front view of the spacer for battery module preparation of FIG. 6.

In the middle part of the spacer 400 are formed through-holes (first through-holes) 550, through which pairs of battery receiving parts, for example, two battery receiving parts 500 and 600, located at the opposite sides of the spacer 400 about the through-holes 550 communicate with each other. In some of the opening parts 510 are also formed through-holes (second through-holes) 560. The first through-holes 550 are used as flow channels for a coolant, such as air, and the second through-holes 560 are used as spaces for mounting thermistors (not shown). Especially, the second through-holes 560 are open both in the lateral direction and the thickness direction of the spacer 400, and therefore, when the thermistors are mounted in the second through-holes 560, it is possible to accurately measure the temperature of the unit cells. The structure of the through-holes 550 and 560 is illustrated in more detail in FIG. 9, which is a front view of the spacer 400.

Referring back to FIGS. 6 and 7, the spacer 400 is provided at the middle part of the upper end thereof with vertical through-channels 570, which are formed at positions where every four battery receiving parts 500, 501, 600, and 601 adjacent to each other on the same plane and the opposite plane of the spacer 400 intersect. The vertical through-channels 570 communicate with the corresponding first through-holes 550, and therefore, the vertical through-channels 570 can be also used as the flow channels for the coolant. Of course, the vertical through-channels 570 communicate with the second through-holes 560 formed in some of the opening parts 510.

Figure 10:
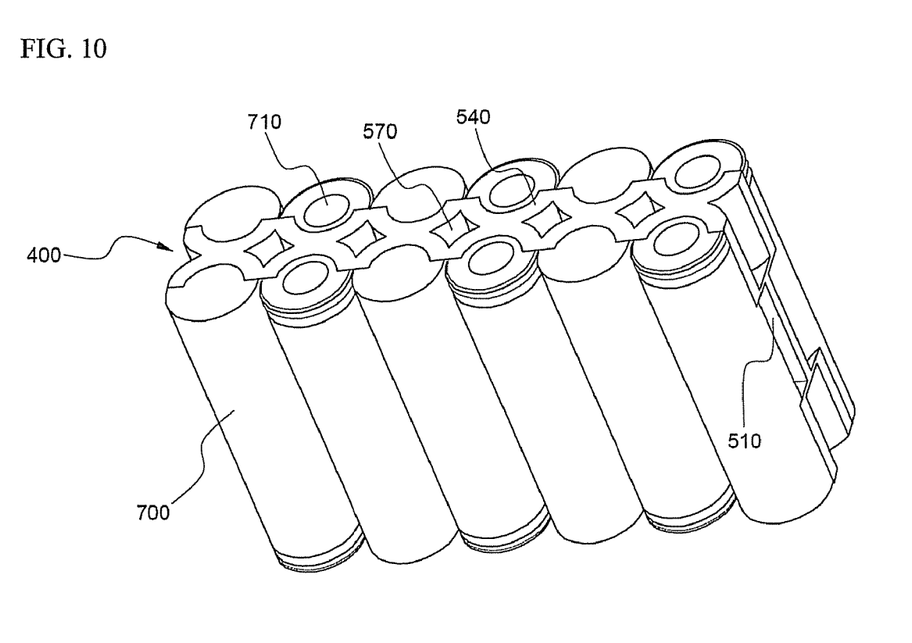
FIG. 10 is a perspective view illustrating cylindrical batteries mounted to the spacer of FIG. 6.

FIG. 10 is a perspective view typically illustrating cylindrical batteries mounted to the spacer of FIG. 6.

Referring to FIG. 10, unit cells 700 are mounted to the opposite major surfaces of the spacer 400 in line. The covers 540 formed at the upper and lower ends of the respective battery receiving parts (not shown due to the unit cells received in the respective battery receiving parts) partially surround the upper and lower end surfaces of the unit cells 700 to stably fix the unit cells 700. However, the covers 540 surround only the outer circumferential surfaces of the unit cells. As a result, the electrode terminals of the unit cells 700 are exposed, and therefore, the electrical connection between the unit cells 700 is easily accomplished.

Although the mounting structure is compact as described above, large portions of the cylindrical unit cells 700 are exposed through the vertical through-channels 570 and the opening parts 510. Consequently, air flows through the exposed spaces, and therefore, heat generated from the unit cells 700 during the charge and discharge of the unit cells 700 is easily removed.

Figure 11:
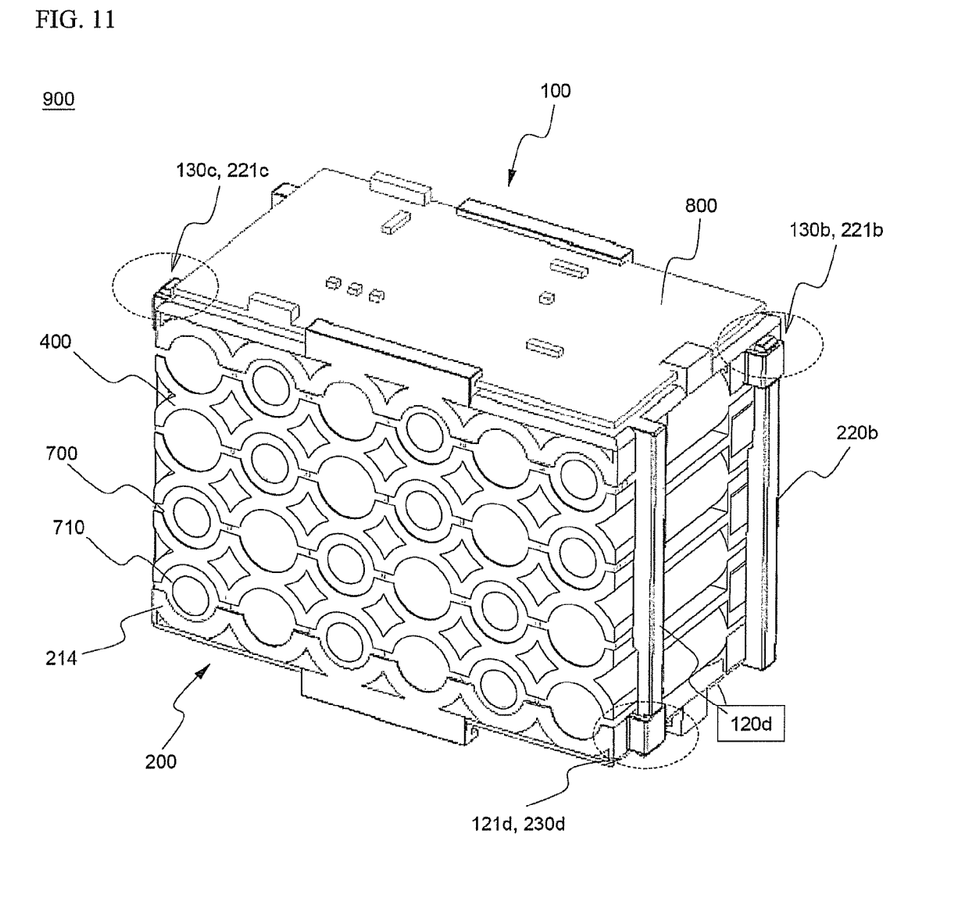
FIG. 11 is a perspective view illustrating unit cells mounted to the spacer of FIG. 7.

FIG. 11 is a perspective view illustrating a battery pack 900 having unit cells 700 mounted to the frame members 100 and 200.

Referring to FIG. 11, the battery pack 900 is constructed by mounting a plurality of unit cells 700 to the spacer 400, stacking the spacer 400 on the lower frame member 200, and coupling the upper frame member 100 having a PCM 800 mounted on the upper major surface thereof with the lower frame member 200.

The upper frame member 100 and the lower frame member 200 are coupled with each other by inserting the hook 121d of the upper frame member 100 into the coupling groove 230d of the lower frame member 200, and inserting the hooks 221b and 221c of the lower frame member 200 into the coupling grooves 130b and 130c of the upper frame member 100, respectively.

The unit cells 700 are mounted in a hexahedral inner space defined by the bar 120d of the upper frame member 100 and the bar 220b of the lower frame member 200.

The side extensions 114 and 214 of the upper and lower frame members 100 and 200 protrude in the shape of a semicircular plate such that electrode terminals 710 of the cylindrical unit cells 700 are exposed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the frame member and the spacer for battery pack preparation according to the present invention have the effect of stably mounting the cylindrical unit cells and the protection circuit module (PCM) while minimizing the number of components, preventing the occurrence of short circuits between the unit cells during the assembly or the use of the battery pack, and effectively removing heat generated from the unit cells during charge and discharge of the unit cells, whereby the battery pack is manufactured in a compact and stable structure through a simple assembly process.

What is claimed is:

1. A battery pack constructed by loading cylindrical batteries as unit cells to a spacer wherein:
    the spacer is provided at opposite major surfaces of a rectangular frame with pluralities of semi-cylindrical battery receiving parts corresponding to outer surfaces of the cylindrical batteries, the battery receiving parts being partially open such that the battery receiving parts communicate with neighboring battery receiving parts on the same plane, and mounting the cylindrical batteries with the spacer to a frame member;
    the frame member includes an upper frame member having one major surface to which a protection circuit module (PCM) is mounted, and a lower frame member coupled with the upper frame member, the upper and lower frame members being provided at opposite major surfaces thereof with semi-cylindrical battery receiving parts corresponding to outer surfaces of the cylindrical unit cells mounted between the upper and lower frame members;
    the spacer is provided at positions where every four battery receiving parts adjacent to each other on the same plane and the opposite plane of the frame intersect with vertical through-channels, wherein the vertical through-channels communicate with first through-holes disposed in an opening part of the battery receiving parts;
    the battery receiving parts further comprising second through-holes through which the battery receiving parts formed at one major surface of the frame communicate with the battery receiving parts formed at the other major surface of the frame; and
    the upper frame member is provided at an upper major surface thereof with assemblable coupling parts for coupling the PCM to the upper frame member.

2. The battery pack according to claim 1, wherein each semi-cylindrical battery receiving part is constructed in a structure in which each semi-cylindrical battery receiving part is open at a middle part thereof such that two neighboring unit cells communicate with each other through the open middle part and each semi-cylindrical battery receiving part partially surrounds upper and lower parts of the unit cells.

3. The battery pack according to claim 1, wherein each semi-cylindrical battery receiving part includes plate-shaped side extensions protruding in the shape of a semicircle for partially covering outer circumferential surfaces at opposite ends of the corresponding unit cell while electrode terminals of the corresponding unit cell are exposed.

4. The battery pack according to claim 1, wherein the upper and lower frame members are provided with assemblable coupling parts that can be coupled with and separated from each other, respectively.

5. The battery pack according to claim 4, wherein the assemblable coupling parts include bars extending from sides of the upper and/or lower frame members and having coupling elements formed at ends thereof, and coupling grooves, corresponding to the bars, formed at the lower and/or upper frame members.

6. The battery pack according to claim 5, wherein the coupling elements are engageable and disengageable hooks.

7. The battery pack according to claim 5, wherein the coupling elements and the coupling grooves are provided at inner surfaces thereof with thread parts, and additional screws are threadedly engaged with the inner surfaces of the coupling elements and the coupling grooves.

8. The battery pack according to claim 4, wherein the bars are formed at two diagonally opposite corners of the upper frame member and at two diagonally opposite corners of the lower frame member which are adjacent to the two diagonally opposite corners of the upper frame member.

9. The battery pack according to claim 1, wherein the upper and lower frame members are coupled with each other by coupling members.

10. The battery pack according to claim 1, wherein the assemblable coupling parts are slide coupling type protrusions formed at sides or corners of the upper frame member.

11. The battery pack according to claim 1, wherein the assemblable coupling parts are engageable and disengageable hooks formed at sides or corners of the upper frame member.

12. The battery pack according to claim 1, wherein the upper and lower frame members are constructed in the same shape, and the upper and lower frame members are assembled by arranging the upper and lower frame members such that the upper and lower frame members are opposite to each other and coupling upper and lower frame members with each other.

13. The battery pack according to claim 1, wherein the frame member is made of a plastic material having high strength and conductivity, and the frame member is manufactured by injection molding.

14. The battery pack according to claim 1, wherein the battery receiving parts are provided at the upper and lower ends thereof with covers, which protrude toward upper and lower end surfaces of the unit cells along semi-cylindrical circumferential surfaces thereof to stably fix the unit cells.

15. The battery pack according to claim 14, wherein the covers protrude from the semi-cylindrical inner circumferential surfaces of the battery receiving parts in a U-shaped (horseshoe-shaped) plate structure, whereby the covers correspond to the upper and lower end surfaces of the unit cells when the unit cells are received in the respective battery receiving parts.

16. The battery pack according to claim 1, wherein the open regions (the opening parts) are formed in the middle regions of the battery receiving parts.

17. The battery pack according to claim 16, wherein the opening parts have no additional height, whereby the opening parts are equal to the thickness of the frame.

18. The battery pack according to claim 1, wherein temperature sensors are mounted in the vertical through-channels for measuring the temperature of the unit cells.

19. The battery pack according to claim 18, wherein the vertical through-channels, in which the temperature sensors are mounted, are connected to some, which are formed such that the opposite major surfaces of the frame communicate with each other, of the opening parts.

* * * * *